March 29, 1927.  H. W. RHINELANDER  1,622,467
OIL WELL JACK
Filed Oct. 20, 1926
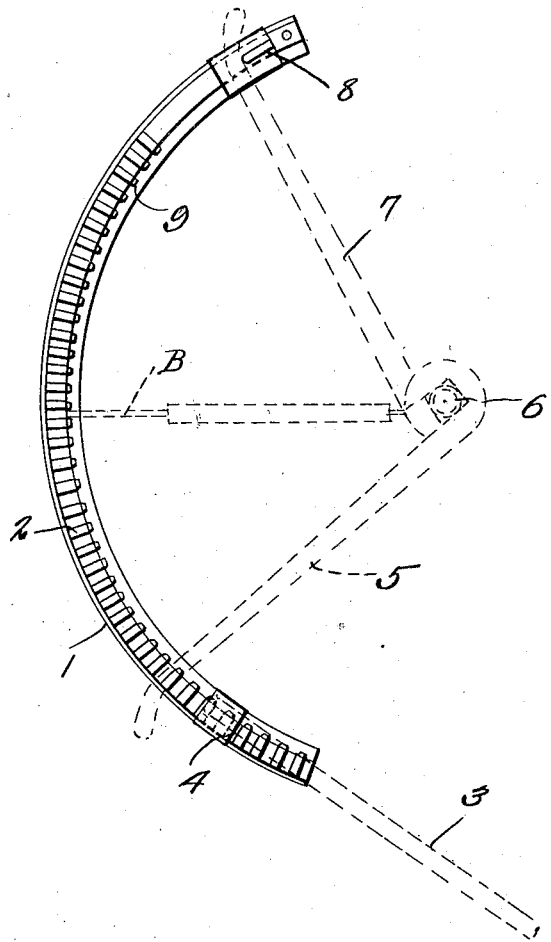
Fig.1.
Fig.2.
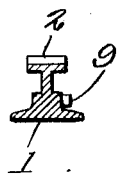
H. W. Rhinelander
Inventor
By C. A. Snow & Co.
Attorneys.

Patented Mar. 29, 1927.

1,622,467

UNITED STATES PATENT OFFICE.

HARRY W. RHINELANDER, OF PALEMBANG, SUMATRA, EAST INDIES.

OIL-WELL JACK.

Application filed October 20, 1926. Serial No. 142,976.

This invention relates to an oil well jack of that type utilized for setting up or breaking down tool joints.

It is an object of the present invention to provide a means whereby the tool brace can be held from slipping when, for any reason, the same is not properly placed on the rack.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown. In said drawings, Figure 1 is a plan view of an oil well rack embodying the present improvements.

Figure 2 is a section through the rack.

Referring to the figures by characters of reference 1 designates an arcuate rack forming the base portion of an oil well jack. This rack is provided, in its top surface, with the usual ratchet teeth 2 for engagement by pawls not shown but which are actuated by a hand lever 3. These pawls are mounted within cage 4 adapted to thrust against a wrench 5 for engaging a tool 6 at one side of the joint therein. Another wrench 7 is provided for engaging the tool at the other side of the joint and has an abutment in the form of a post 8 mounted on one end portion of the rack 1. Gear teeth 9 are provided along the inner side of the rack and are provided for engagement by the tool brace B so as to prevent it from slipping should it not be properly placed. These teeth upon the concave surface of the rack constitute the present improvements and are advantageous because they prevent injuries such as often result from the inadvertent release of a tool brace while the jack is in operation.

What is claimed is:

1. In an oil well jack an arcuate rack, and a longitudinal series of gear teeth upon the concave side of the rack.

2. In an oil well jack an arcuate rack, a cage mounted for adjustment therealong, a post mounted on the rack, and a longitudinal series of gear teeth upon the concave side of the rack for engagement by a misplaced tool brace.

In testimony that I claim the foregoing as my own, I have hereto affixed my signature.

HARRY W. RHINELANDER.